United States Patent [19]

Kimberlin

[11] 4,232,571

[45] Nov. 11, 1980

[54] FLOOR MOUNTED SHIFT CONTROL MECHANISM WITH DRIVE TRANSMITTING CABLES

[75] Inventor: Dan R. Kimberlin, Frankenmuth, Mich.

[73] Assignee: General Motors Corporation, Detroit, Mich.

[21] Appl. No.: 11,396

[22] Filed: Feb. 12, 1979

[51] Int. Cl.³ .............................................. B60K 41/04
[52] U.S. Cl. ................................. 74/878; 74/483 R; 74/538; 70/247; 70/252
[58] Field of Search ..................... 74/878, 483 R, 538, 74/475; 70/252, 247, 248, 256

[56] References Cited

U.S. PATENT DOCUMENTS

| | | | |
|---|---|---|---|
| 2,922,315 | 1/1960 | Primeau | 74/483 |
| 3,134,269 | 5/1964 | Shimanckas | 74/878 X |
| 3,648,490 | 3/1972 | Kimberlin | 70/252 X |
| 3,998,109 | 12/1976 | O'Brien | 74/475 X |
| 4,160,499 | 7/1979 | Baba | 74/878 X |

FOREIGN PATENT DOCUMENTS 757915 10/1933 France ........................................ 74/483

*Primary Examiner*—Dave W. Arola
*Attorney, Agent, or Firm*—Donald F. Scherer

[57] ABSTRACT

A manual shift control mechanism for a transmission has two drive transmitting cables which are connected to the steering column lock mechanism and the transmission control mechanism, respectively. The cables are interconnected by a pin which is connected through a leaf type spring to the manual shift lever. When the steering column lock mechanism is in the "Lock" mode, the cable attached thereto cannot move so that movement of the shift lever results in flexing of the spring and the pin and transmission cable does not move. Thus, when the steering column lock mechanism is in the "Lock" mode, the transmission control mechanism cannot be moved from the "Park" mode. When the steering column lock mechanism is in an operating mode other than "Lock", movement of the manual shift lever is transmitted to the transmission cable through the spring and pin to effect shifting of the transmission control.

1 Claim, 3 Drawing Figures

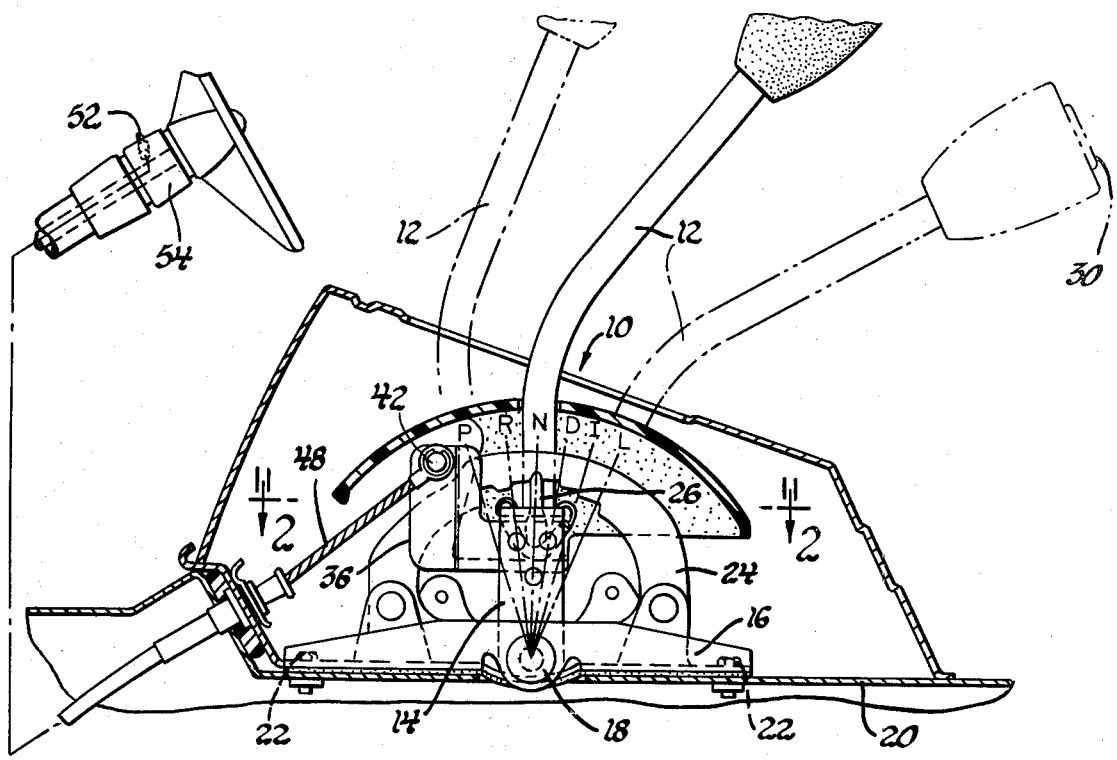
Fig.1
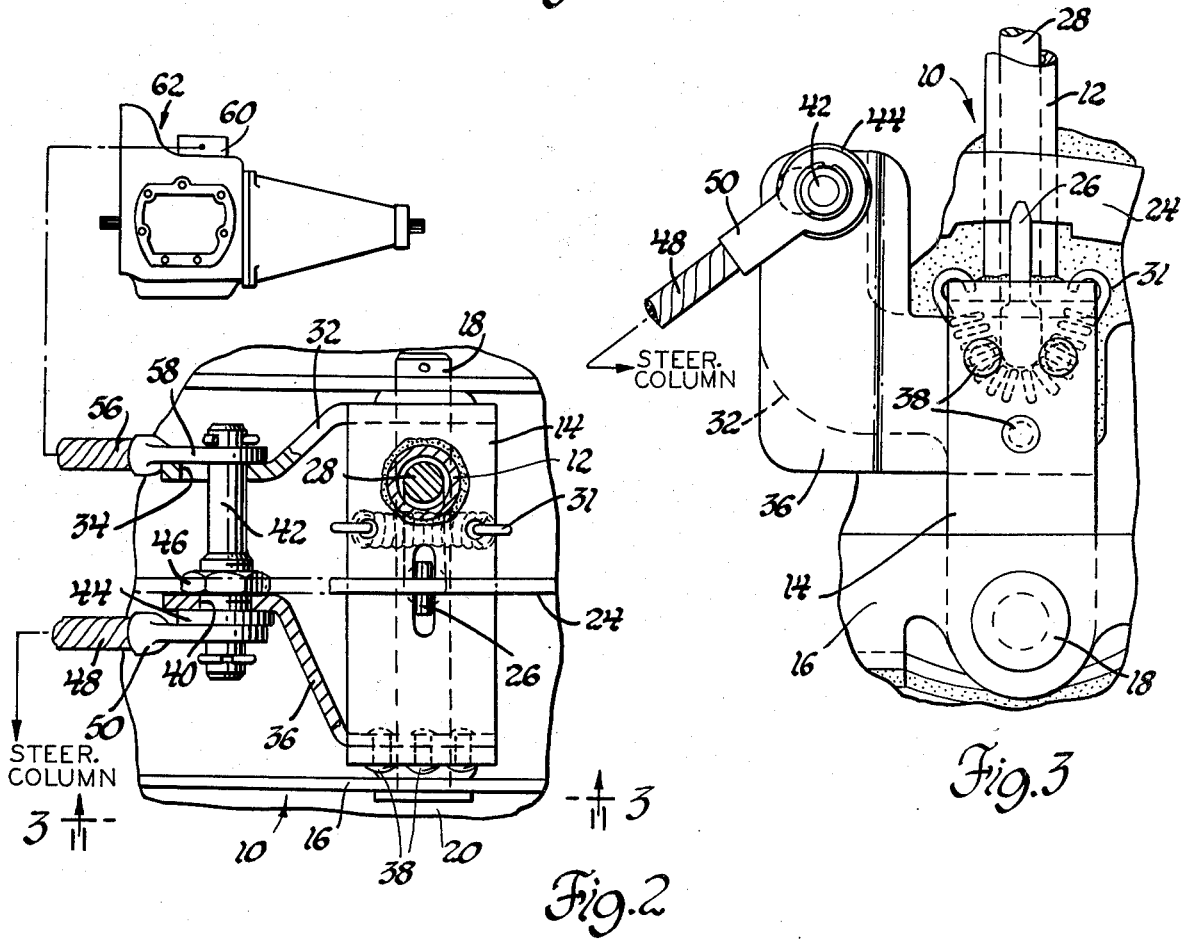
Fig.2
Fig.3

FLOOR MOUNTED SHIFT CONTROL MECHANISM WITH DRIVE TRANSMITTING CABLES

This invention relates to transmission shift control mechanisms and more particularly to such mechanisms having a plurality of drive transmitting cables.

It is an object of this invention to provide an improved transmission shift control mechanism which will permit a floor mounted shift lever to be locked by a steering column lock mechanism and wherein the forces on the shift lever are not transmitted to the transmission control when the "Lock" mode is selected on the steering column locking mechanism.

It is another object of this invention to provide an improved transmission shift control mechanism wherein a manual lever is pivotally mounted on the vehicle floor and is connected to a steering column cable and a transmission control cable through a spring member which prevents transmission of manual forces to the transmission control cable when the steering column cable is held stationary by the steering column lock mechanism.

These and other objects and advantages of the present invention will be more apparent from the following description and drawings in which:

FIG. 1 is an elevational view of a shift control mechanism;

FIG. 2 is a view taken along line 2—2 of FIG. 1; and

FIG. 3 is a view taken along line 3—3 of FIG. 2.

Referring to the drawings, there is seen in FIG. 1 a manual shift control mechanism generally designated 10 including a manual shift lever 12 which is secured to a lever bracket 14 which is pivotally mounted on a support bracket 16 by a pin 18. The support bracket 16 is secured to the vehicle floor 20 by a plurality of fasteners 22. The support bracket 16 has secured thereto a detent plate 24 which cooperates with a detent member 26 to maintain the manual lever 12 in the transmission mode selected by the operator. The detent member 26 may be disengaged from the detent plate 24 by a push rod 28 coaxially disposed in the manual lever 12 and operated by a push button 30. When the push button 30 is in the released position, a coil spring 31 maintains the detent 26 in abutment with the detent plate 24. A more complete description of the manual lever 12 and the detent mechanisms 24 and 26 may be found in U.S. Pat. No. 3,998,109 issued Dec. 21, 1976, to O'Brien and which is assigned to the assignee of this application. The manual lever 12 may be positioned to establish a plurality of transmission modes such as Park (P), Reverse (R), Neutral (N), Drive (D), Intermediate (I) and Low (L).

The lever bracket 14 has an extension 32 which has a slot 34 formed in the outer end thereof. A leaf spring 36 is secured to the lever bracket 14 by a plurality of fasteners, such as rivets 38, and has an aperture 40 formed in the free end thereof.

A pin member 42 extends between the extension 32 and leaf spring 36 by passing through the aperture 40 and the slot 34. The pin 42 has formed thereon a shoulder 44 which is held in abutment with the leaf spring 36 by a threaded fastener 46 which cooperates with the shoulder 44 to secure the pin 42 to the leaf spring 36.

A steering column cable 48 has an end fitting 50 which is slidably fitted on the pin 42, while the other end of steering column cable 48 is attached to a conventional steering column lock mechanism 52 disposed in a steering column 54. The steering column cable 48 is preferably a conventional sheathed push/pull type cable and the steering column lock mechanism 52 can be constructed in accordance with the locking mechanism disclosed in U.S. Pat. No. 3,648,490 issued to Kimberlin et al Mar. 14, 1972, or in accordance with many of the conventional steering column locking mechanisms currently used for automotive vehicles.

A transmission control cable 56 has one end 58 slidably fitted on pin 42 adjacent the slot 34 while the other end is connected at 60 to a conventional transmission control valve, not shown, which is housed in a transmission generally shown as 62. The transmission 62 can be constructed in accordance with many of the conventional automatic transmissions and is preferably a front wheel drive type transmission.

As is well known in column mounted transmission shift controls, when the steering column lock mechanism is in the "Lock" mode, the transmission control cannot be moved from the "Park" mode. This is also true of many floor mounted shift control mechanisms, however, the conventional floor mounted mechanisms are generally constructed so that a linkage or cable is connected to the transmission control valve and a second linkage is connected between the control valve and the steering column lock mechanism. With these conventional type systems, a considerable amount of production tolerances can occur in the linkages which will permit the transmission control to be forced out of the "Park" mode even though the steering column is in the "Lock" mode.

The present invention prevents the transmission of shift lever forces to the transmission cable 56 when the steering column locking mechanism 52 is in the "Lock" mode. When the "Lock" mode is selected, the cable 48 is held stationary such that movement of the manual lever will result in flexing of the leaf spring 36 and due to the slot 34, the movement of bracket 14 is not transmitted to the transmission cable 56. In fact, when the leaf spring 36 flexes, it tends to be straightened which results in movement in the end of pin 42 adjacent slot 34 in a direction such that the transmission control cable 56 is moved toward the "Park" mode. The leaf spring 36 is designed to be flexible throughout the range of manual load which can be applied to the shift lever 12 before breaking of the shift lever will occur. When the steering column lock mechanism 52 is in a mode other than "Lock", the leaf spring 36 has sufficient stiffness to move the pin 42 and cables 48 and 56 in unison with the shift lever 12 and lever bracket 14.

From the above description, it is therefore apparent that the transmission control will be maintained in the "Park" mode regardless of the force placed on the manual lever 12 whenever the steering column cable 48 is held stationary by the steering column lock mechanism 52.

The embodiments of the invention in which an exclusive property or privilege is claimed are defined as follows:

1. A floor mounted manual transmission shift control mechanism for a vehicle having a steering column with a multiposition lock mechanism and a multiposition transmission mode control mechanism, said shift control mechanism comprising; a manual control lever; longitudinally movable first cable means operatively connected with the lock mechanism and being held from longitudinal movement when the lock mechanism is in a predetermined position; longitudinally movable second cable means operatively connected to a transmission mode control mechanism; a bracket pivotally mounted for movement with said manual control lever; spring means secured to said bracket, pin means secured to said spring means and drivingly connected to said first cable means for resiliently connecting said bracket and said first cable means through said spring means to move said first cable means longitudinally in response to pivoting of said bracket, said spring means permitting relative motion between said bracket and said first cable means when said first cable means is held from longitudinal movement; and an extension integral with said bracket, said pin means also being operatively connected to said second cable means, and supported in said extension for transmitting motion from said bracket through said spring means and said pin means to said second cable means when said first cable means is free to move longitudinally.

* * * * *